United States Patent
Fix et al.

(10) Patent No.: US 8,277,245 B2
(45) Date of Patent: Oct. 2, 2012

(54) METHODS AND SYSTEMS FOR FORMING DISCRETE WIRE RIBBON CABLES

(75) Inventors: Martin G. Fix, Indianapolis, IN (US); Jayson K. Bopp, Fishers, IN (US)

(73) Assignee: Raytheon Company, Waltham, MA (US)

( * ) Notice: Subject to any disclaimer, the term of this patent is extended or adjusted under 35 U.S.C. 154(b) by 39 days.

(21) Appl. No.: 12/889,811

(22) Filed: Sep. 24, 2010

(65) Prior Publication Data
US 2012/0077371 A1    Mar. 29, 2012

(51) Int. Cl.
*H01R 12/59* (2011.01)
(52) U.S. Cl. ........................................... 439/497
(58) Field of Classification Search .................. 439/497, 439/418, 344, 460, 462, 676, 404, 941, 395, 439/504, 942
See application file for complete search history.

(56) References Cited

U.S. PATENT DOCUMENTS

| | | | | |
|---|---|---|---|---|
| 4,139,727 A * | 2/1979 | Kuballa | ......................... | 174/261 |
| 5,328,386 A * | 7/1994 | Frantz et al. | ................... | 439/465 |
| 6,528,728 B1 * | 3/2003 | Shima | ........................... | 174/101 |
| 7,758,374 B2 * | 7/2010 | Yu et al. | ........................ | 439/493 |
| 7,952,027 B2 * | 5/2011 | Grelck | ......................... | 174/72 A |

* cited by examiner

*Primary Examiner* — Edwin A. Leon
(74) *Attorney, Agent, or Firm* — Thorpe North & Western LLP

(57) ABSTRACT

Methods and systems for forming discrete wire ribbon cables for use in electronic networks are provided. In some embodiments, the organizer may include an upper bracket and a lower bracket. The lower bracket may be configured to mate with the upper bracket. The upper bracket and the lower bracket may combine to define a plurality of holes. The plurality of holes may be sized to at least partially enclose a set of discrete conductors. Each of the set of discrete conductors may be individually insulated.

22 Claims, 5 Drawing Sheets

METHODS AND SYSTEMS FOR FORMING DISCRETE WIRE RIBBON CABLES

TECHNICAL FIELD

The present disclosure generally relates to wiring and cables, and more specifically to methods and systems for forming discrete wired ribbon cables.

BACKGROUND

A ribbon cable is a cable with many conducting wires running parallel to one another in a single strip of material. The cable resembles a ribbon, typically formed wide and flat. Ribbon cables are often used inside computers and other electronic devices with internal peripherals (e.g., servers, etc.). Some examples of standard ribbon cables include Parallel ATA cables, high-speed ULTRA-ATA cables, and flexible flat cables (FFC).

In general, ribbon cables are used because they provide a single termination for all of the cables, sometimes known as an insulation-displacement connector (IDC). An IDC includes a set of sharp contacts so that when an IDC is forced onto the ribbon cable, all of the conductors are terminated in one process. In some forms, such as FFC, a cable consists of a flexible, flat plastic film base with multiple conductors bonded to a surface of the base. The base may be reinforce with one or more stiffeners to facilitate insertion and/or connections (e.g., zero insertion force (ZIF) and/or low insertion force (LIF) connections). For example, some military specifications (e.g., MIL-DTL-49055) discuss ribbon cable and identify several details of standard ribbon cables.

Ribbon cables may incidentally and/or accidentally function as antennas. In essence, the ribbon cables broadcast random noise across several bands of the electromagnetic spectrum. In some applications, the use of ribbon cables is restricted by limitations on use and/or by requiring additional shielding (e.g., copper-braiding). Further, although the ribbon cable provides an easy way to terminate the conductors in a single step, the shape of the ribbon may add constraints on routing and geometry of the cable.

SUMMARY

The present disclosure provides techniques that substantially eliminates or reduces at least some of the disadvantages and problems associated with previous methods and systems.

In some embodiments, the organizer may include an upper bracket and a lower bracket. The lower bracket may be configured to mate with the upper bracket. The upper bracket and the lower bracket may combine to define a plurality of holes. The plurality of holes may be sized to at least partially enclose a set of discrete conductors. Each of the set of discrete conductors may be individually insulated.

In other embodiments, a multi-wire cable for use in electronic networks may include a set of discrete electrical conductors of similar length, at least one organizer, and a first connector. The set of discrete electrical conductors may be arrayed in a generally flat plane. Each electrical conductor may have a respective first end and a second end. Each one of the set of electrical conductors may be wrapped in an individual insulator. The at least one organizer may be disposed between the first end and the second end of the set of discrete electrical conductors. The organizer may include an upper bracket and a lower bracket. The lower bracket may be configured to mate with the upper bracket. The upper bracket and the lower bracket may combine to define a plurality of holes. The plurality of holes may be arrayed to at least partially enclose each of the set of discrete electrical conductors. The first connector may be disposed at the first end of each conductor of the set of electrical conductors. And the organizer may operate to align the set of discrete electrical conductors so that a second connector may be disposed at the second end of each conductor of the set of electrical conductors.

In some embodiments, a method for forming a discrete wire ribbon cable may include arranging a set of discrete electrical conductors within an organizer, attaching a first insulation displacement connector, sliding the organizer along the set of discrete electrical conductors, and attaching a second insulation displacement connector. The set of discrete electrical conductors may be disposed at least partially within a set of holes defined by an organizer including two brackets. The two brackets may be joined together to form the organizer. The first insulation displacement connector may be attached at a first point of the set of discrete electrical conductors. The organizer may be slid along the set of discrete electrical conductors to a desired length. The method may include applying a compressive force to the organizer to restrain the organizer from sliding along the set of discrete electrical conductors. The second insulation displacement connector may be attached at a second point of the set of discrete electrical conductors.

Forming discrete wire ribbon cables incorporating the teachings of the present disclosure may provide several benefits in comparison to typical ribbon cables. For example, discrete wire ribbon cables may allow reduced minimum bend radius, simplify shielding of the discrete conductors, allow rotation and/or reorientation to correct misalignment issues without significant reworking, increase flexibility for PCB layout and design, facilitate splitting cables, and/or provide simple interfaces between commercial of the shelf (COTS) connectors and government of the shelf (GOTS) connectors. Use of the methods disclosed herein may provide simplified manufacturing of such discrete wire ribbon cables either by reducing the number of manufacturing steps, reducing the complexity of the parts required, and/or increasing the quality and/or repeatability of the manufacturing process. Use of shorter cables, based on the reduced cable length of a discrete wire ribbon cable compared to a traditional ribbon cable may also decrease signal travel time, thereby increasing communication speed and/or reducing power and/or signal quality loss. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 2 through 7B, wherein like numbers are used to indicate like and corresponding parts.

Figure 1A:
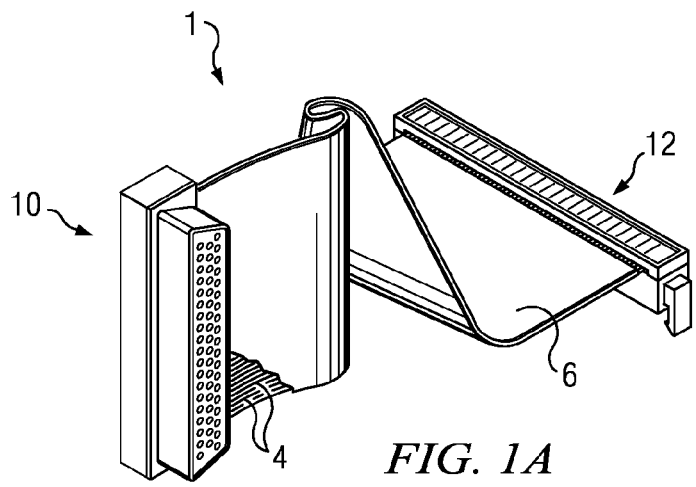
FIGS. 1A, 1B, and 1C illustrate example embodiments of prior art ribbon cables.
Figure 1B:
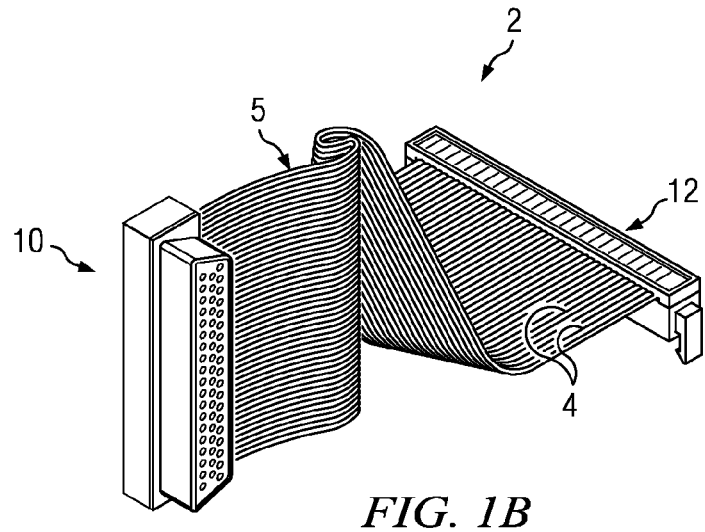
Figure 1C:
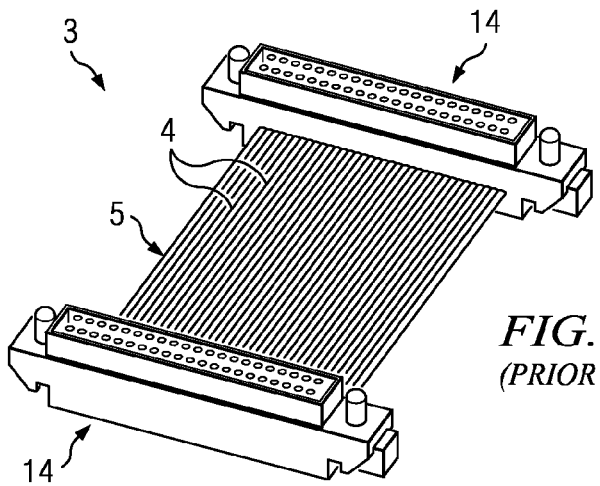

FIGS. 1A-1C illustrate example embodiments of prior art ribbon cables 1, 2, and 3, respectively, and demonstrate various challenges and/or drawbacks inherent in those ribbon cables. Ribbon cables 1, 2, and 3 include a set of conductors 4 integrally molded and/or bonded to a flexible plastic ribbon (e.g., PVC, PTFE, and/or FEP) and various connectors 10, 12, and 14. Ribbon cable 1 also includes an external shield 6.

Conductors 4 may include any appropriate electrical conductor, including, for example, metal wires (e.g., copper and/or aluminum). A set of conductors 4 may be bonded to a plastic strip of material 5 and/or a plastic strip of material 5 may be molded around a set of conductors. The plastic strip 5 provides electrical insulation, thereby isolating the neighboring conductors electrically from one another. In addition, plastic strip 5 holds the set of conductors 4 in a single package, which may simplify the use of connectors for termination and/or physical transport of the set of conductors 4. The set of conductors 4 is attached to and/or molded into plastic strip 5 at a pre-determined pitch (e.g., 1.0 mm pitch) to correspond to the connectors to be used. The term "pitch" refers to the distance from center-to-center of neighboring electrical conductors.

As shown in FIGS. 1A and 1B, however, the plastic strip 5 also creates problems with routing ribbon cables 1 and 2. For example, the entire ribbon must be folded at an angle to make a turn. These folds typically require a minimum bend radius to protect the material in the plastic strip 5. Given the minimum bend radius, using ribbon cable 1 or 2 may require a large volume of space inside an electronic component, even when interior space is at a premium. In addition, if additional shielding 6 is required on ribbon cable 1, the routing of ribbon cable becomes even more complicated in order to maintain the integrity of the shielding (as shown in FIG. 1A). In some applications, the design and/or layout of printed circuit boards (PCB) and/or an electronic component (e.g., a server and/or computer case) may be constrained and/or limited by the routing requirements of ribbon cable 1, 2, and 3.

Connectors 10, 12, and 14 may include any device, component, and/or feature of ribbon cable 1, 2, or 3 configured to connect the set of conductors 4 to an electrical device and/or connector. For example, connectors 10, 12, and 14 usually include mass termination connectors (e.g., insulation displacement connectors (IDC)) operable to attach and/or terminate all of the conductors 4 in ribbon cable 1, 2, or 3 in a single operation. IDCs usually include an opening in the body of the connector, into which the ribbon of plastic material is pressed. When an IDC is compressed onto a ribbon cable, the connector cuts through and/or penetrates the plastic material 5 and makes an electrical connection with the conductors 4 within.

FIG. 1C illustrates another drawback of ribbon cable 3. As shown, ribbon cable 3 is a short length of conductors 4 between connectors 14, but includes a large number of conductors 4. The combination of a short and wide ribbon cable 3 makes it impossible to rotate connectors 14 to face the opposite direction. In some products and/or projects, especially those requiring custom board layout, errors in board connector layout may not be discovered until a verification and validation process (V&V) takes place. At that point, correcting the orientation of the connectors on ribbon cable 3 may be a costly change to implement and/or may extend the schedule for completion of the project and/or product.

Figure 2:
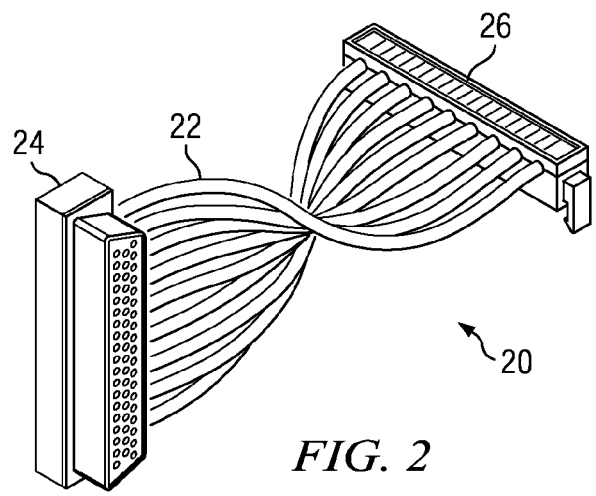
FIG. 2 illustrates an example discrete wire ribbon cable, in accordance with the teachings of the present disclosure.

FIG. 2 illustrates an example discrete wire ribbon cable 20, in accordance with the teachings of the present disclosure. Discrete wire ribbon cable 20 may include a set of conductors 22, and connectors 24 and 26. Each one of the set of electrical conductors 22 may be wrapped in discrete individual insulators rather than bonded to or molded within a ribbon cable 5 as described above in relation to ribbon cables 1, 2, and 3. At the same time, conductors 22 may be arrayed in a single plane to facilitate the use of connectors 24 and 26.

The use of discrete wire ribbon cable 20 may simplify routing by allowing tighter bend radii in comparison to ribbon cables 1 and 2 shown in FIGS. 1A and 1B. In addition, in some embodiments, discrete wire ribbon cable 20 may allow some or all of the conductors 22 to be bundled together and/or shielded (e.g., electromagnetic interference (EMI) shielding). In some applications using discrete wire ribbon cable 20, the design and/or layout of printed circuit boards (PCB) and/or the interior of an electronic component (e.g., a server and/or a computer case) may be more flexible because the requirements and/or limitations of a traditional ribbon cable (e.g., 1, 2, or 3) are removed.

In addition, IDCs 24 and 26 may include industry standard insulation displacement connectors effective to pierce insulation around discrete conductors 22. Traditional ribbon cables 1, 2, and/or 3 may include ribbon material 5 made of FEP and/or other selected materials to comply with safety regulations (e.g., no release of chlorine gas upon combustion such as occurs with PVC). Standard IDCs, however, may not be sufficient to pierce these harder plastic materials, requiring, instead custom and/or special IDCs which require increased costs of use and/or manufacturing. A discrete wire ribbon cable 20, however, may allow the use of different insulation materials (e.g., PTFE, PVDF) in comparison to plastic ribbon 5, allowing the use of standard IDCs at the same time.

Figure 3A:
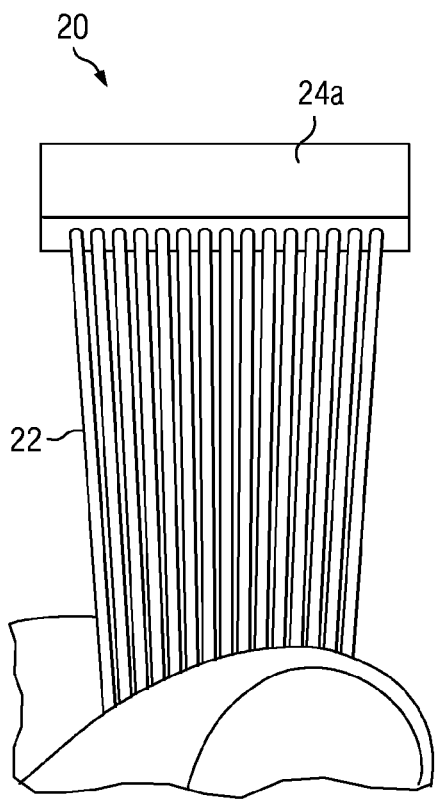
FIGS. 3A and 3B show an example discrete wire ribbon cable, in accordance with the teachings of the present disclosure.
Figure 3B:
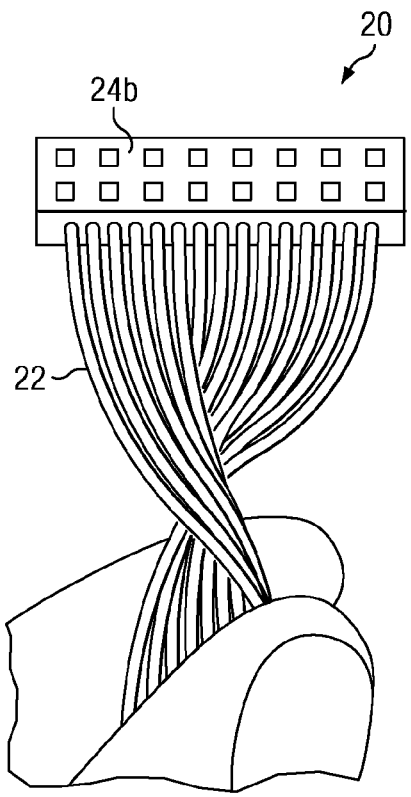

FIGS. 3A and 3B show an example discrete wire ribbon cable 20, in accordance with the teachings of the present disclosure. In addition to the benefits described in relation to FIG. 2, discrete wire ribbon cable 20 may facilitate rotation of various connectors 24 even after they are installed and/or attached to conductors 22. In FIG. 3A, back 24a of connector 24 is oriented upward, out of the page. Because plastic ribbon 5 is not present in discrete wire ribbon cable 20, the relative location of each conductor 22 may change. As shown in FIG. 3B, front 24b of connector 24 may be oriented upward, out of the page, by twisting discrete wire ribbon cable 20 through 180 degrees. This flexibility may avoid the costly changes required during V&V processes for ribbon cables 1, 2, or 3. In addition, the increased flexibility may make routing easier on the front end of the design process.

Figure 4:
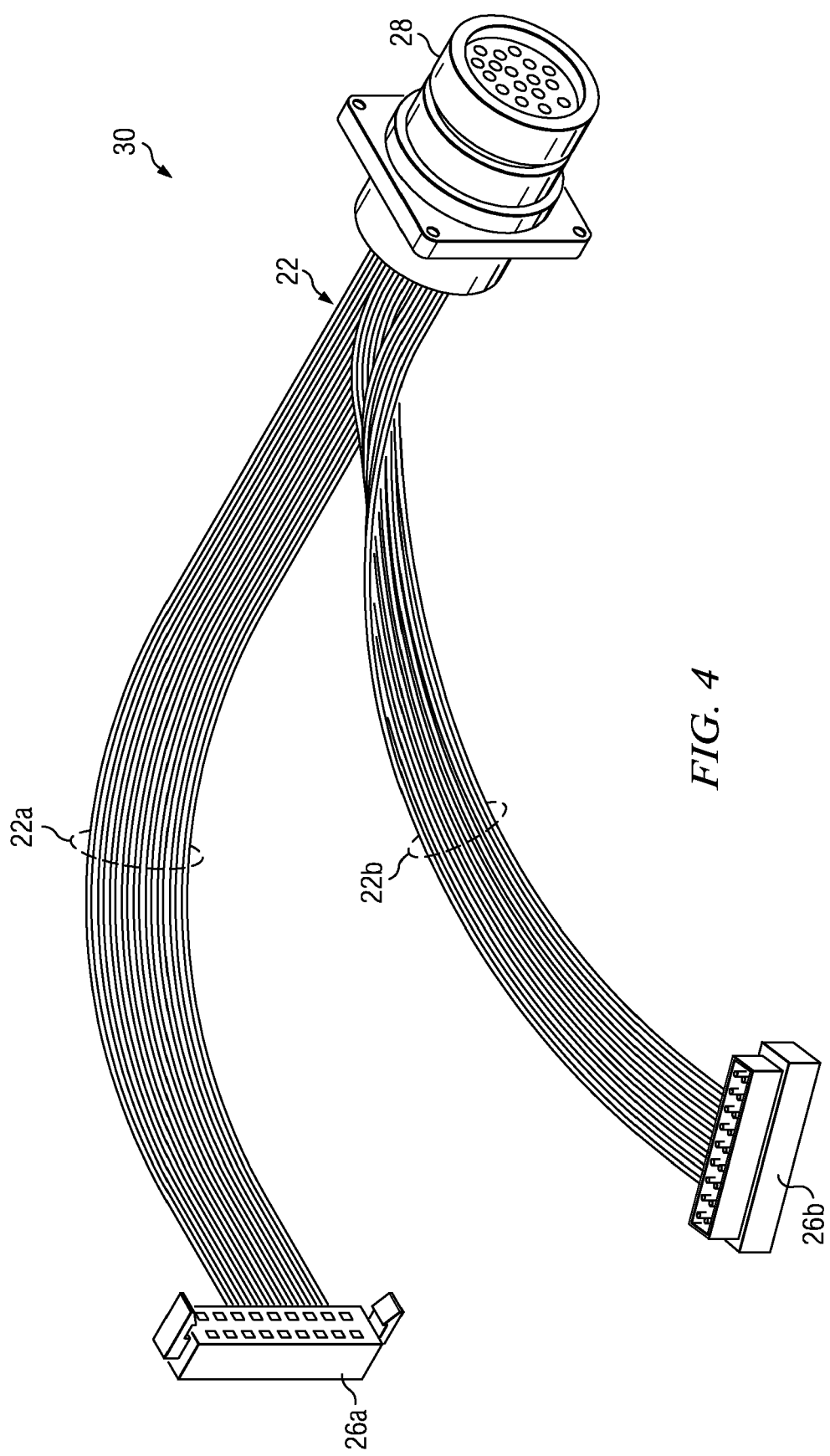
FIG. 4 shows an example discrete wire ribbon cable, in accordance with the teachings of the present disclosure.

FIG. 4 shows an example discrete wire ribbon cable 30, in accordance with the teachings of the present disclosure. In some embodiments of discrete wire ribbon cable 30, a first end of each conductor 22 may be connected to a single connector 28, as shown in FIG. 4. At the same time, a user may desire to connect a first set 22a of conductors 22 to a first connector 26a and a second set of conductors 22b to a second connector 26b. Discrete wire ribbon cable 30 allows splitting the cable easily (e.g., to form a Y-cable). A user can terminate any subset of conductors 22 with a chosen connector (e.g., an IDC), allowing the user to split the conductors 22 into various splits.

In prior art ribbon cables (e.g., 1, 2, or 3), connecting two or more sets of conductors 22 to different connectors would require splitting and/or cutting the underlying ribbon material. Although using polyvinyl chloride (PVC) as the underlying ribbon material might facilitate splitting the ribbon, PVC ribbon is not an approved material because it releases chlorine gas upon combustion. FEP may avoid this problem upon combustion, but is very difficult to split and/or cut. In fact, FEP ribbon cable must be cut by hand, using a microscope with a scalpel or a knife. Not only is there a large risk of damaging one or more connectors, the time and cost of performing this operation may negate any benefit gained by the use of IDC and/or other manufacturing steps.

As shown in FIG. 4, discrete wire ribbon cable 30 may include a connection between various forms of connectors 26 and 28. Various connectors may be referred to as "COTS," "MOTS," "GOTS," or, "NOTS." COTS may refer to a commercial off-the-shelf product. COTS connectors may comport with one or more industry standards and/or conventions. MOTS may refer to a modified (and/or modifiable) off-the-shelf product. A MOTS connector may be very similar to a COTS connector, but with adaptations for specific uses and/or purposes. GOTS may refer to a government off-the-shelf product developed by and/or on behalf of a governmental agency (e.g., military applications using one or more military specifications). NOTS may refer to niche off-the-shelf products developed to meet specific requirements and/or for a specialized and/or narrow market segment.

Discrete wire ribbon cable 30 may allow the use of both COTS and GOTS connectors on a single length of discrete wire ribbon cable 30. For example, a PCB and/or expansion card provided by a vendor may include one or more COTS connections 26 and a electronic network and/or component may require GOTS connections 28. Discrete wire ribbon cable 30 provides a simplified solution for the interface in comparison to traditional ribbon cables (e.g., 1, 2, or 3).

Figure 5A:
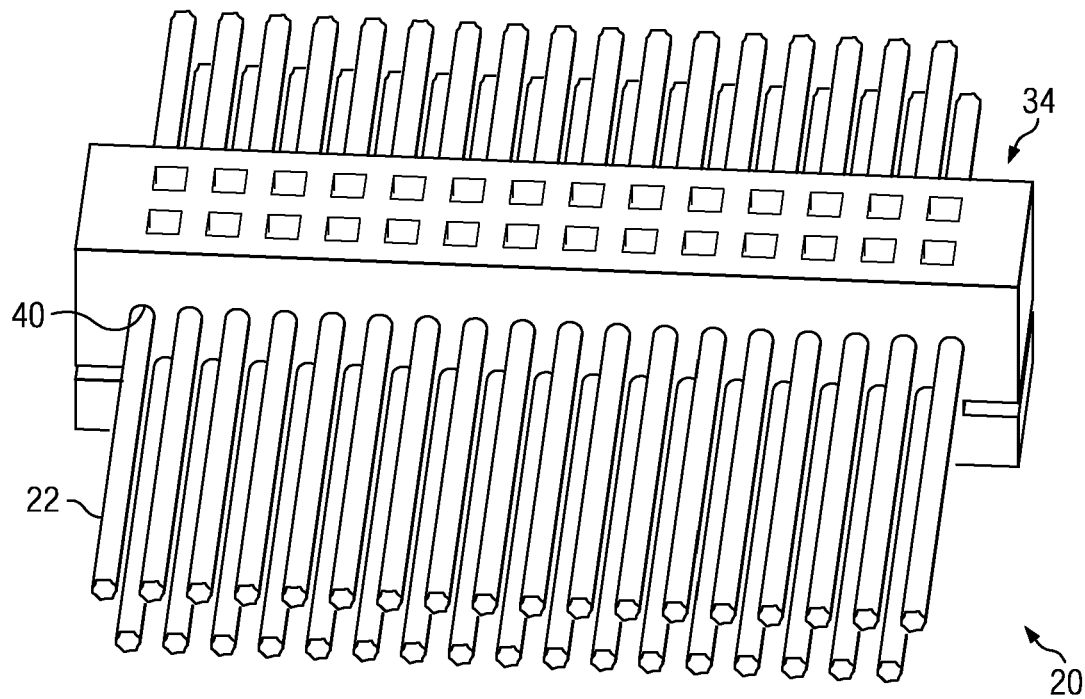
FIGS. 5A and 5B show an example organizer for use in making discrete wire ribbon cables, in accordance with the teachings of the present disclosure.
Figure 6A:
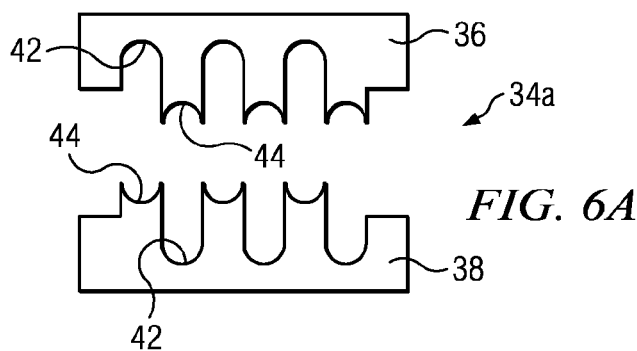
FIGS. 6A-6C are schematic drawings of a partial side view of an example embodiment of an organizer, in accordance with the teachings of the present disclosure.
Figure 6B:
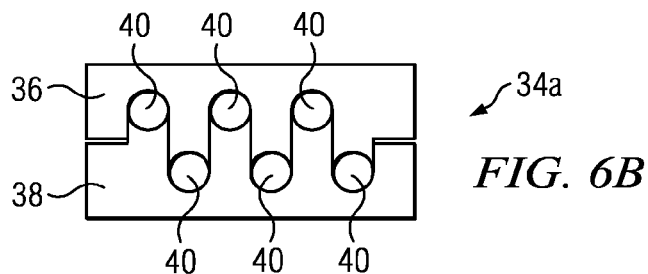
Figure 6C:
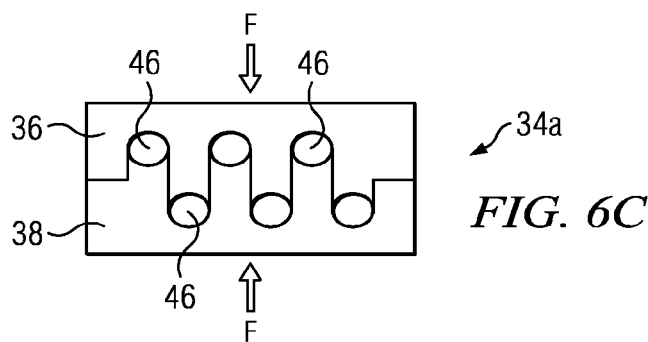
Figure 7A:
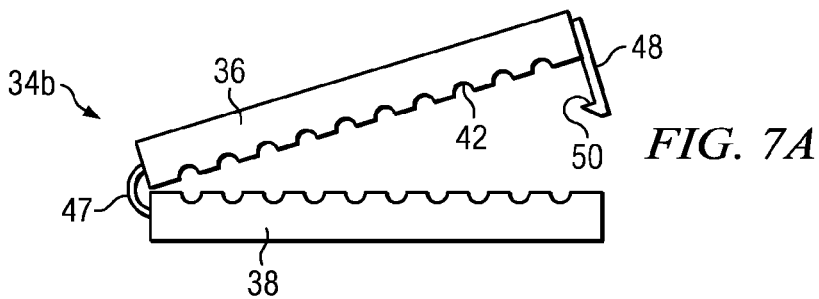
FIGS. 7A-7B are schematic drawings of an example embodiment of an organizer, in accordance with the teachings of the present disclosure.
Figure 7B:
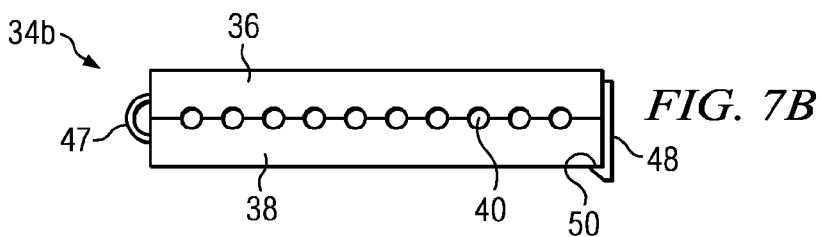

FIG. 5A shows a section of an example organizer 34 deployed on a section of discrete wire ribbon cable 20. Organizer 34 may include any component and/or device configured to fix the respective electrical conductors 22 in relation to one another. Organizer 34 may provide some of the benefits of plastic strip 5 in prior ribbon cables 1, 2, and 3, including, as examples, ease of bundling conductors 22 together, maintaining the set of conductors 22 in a planar array for ease of terminations and/or routing, etc. Organizer 34 may provide stability and/or fixed orientation for the conductors 22 of discrete wire ribbon cable 20. For example, bracket 34 may include various holes 40 in which discrete conductors 22 are at least partially disposed. Bracket 34 may include two separable parts (as shown in FIGS. 6A-6C), or a unitary piece (as shown in FIGS. 7A-7B). In some embodiments, two separate parts 36 and 38 may include a snap-fit connection. Bracket 34 may include any appropriate material (e.g., nylon, PTFE, HDPE, etc.).

In some embodiments, such as that shown in FIG. 6A-6C, organizer 34 may include a comb-shaped configuration. A comb-shaped configuration may allow individual discrete conductors 22 to be threaded into the "teeth" of the comb. In any configuration, organizer 34 may maintain the discrete conductors 22 at a given pitch (e.g., an industry standard pitch, such as a 0.025 inch pitch, a 0.050 inch pitch, or a 1.0 mm pitch, etc.). The size of holes 40 may be selected relative to the outer diameter of discrete conductors 22 so as to either allow bracket 34 to slide along the length of the discrete conductors 22 or to remain fixed (e.g., a slight interference fit).

Figure 5B:
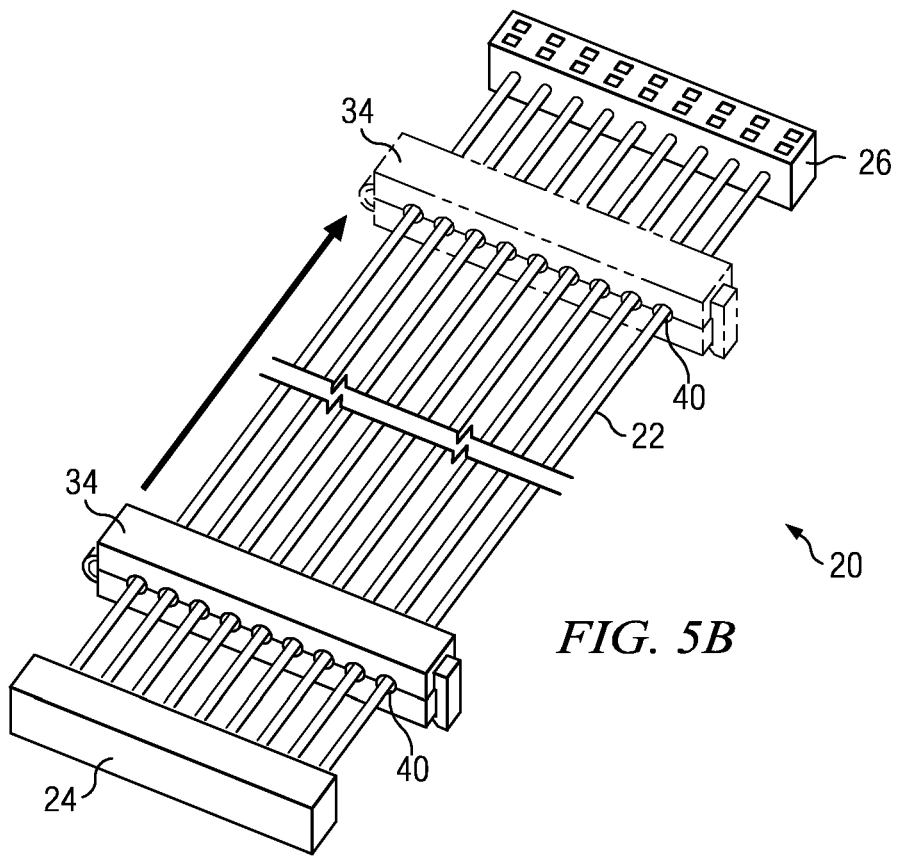

FIG. 5B shows organizer 34 in use to form discrete wire ribbon cable 20. As shown, organizer 34 may be closed around the set of discrete electrical conductors 22. Organizer 34 may be placed adjacent connector 24. Connector 24 may be engaged to complete mass termination of the set of electrical conductors 22. If organizer 34 is moved along the length of the set of discrete electrical conductors 22 as shown in FIG. 5B, then the set of discrete electrical conductors 22 will be held in the same array so that connector 26 may be attached. Organizer 34 will ensure that the set of discrete electrical conductors will be maintained at the same pitch and/or that each one of the set is approximately the same length. In some embodiments, organizer 34 can be further compressed and/or squeezed to hold the set of discrete electrical conductors 22 firmly for the attachment of second connector 26. Organizer 34 may then be removed from the set of electrical conductors and reused for forming additional discrete wire ribbon cables.

FIGS. 6A-6C show one example organizer 34a for use in forming discrete wire ribbon cables. As shown, organizer 34a includes an upper bracket 36 and a lower bracket 38. Both brackets 36 and 38 may include grooves 42 and teeth 44 (FIG. 6A). When upper bracket 36 and lower bracket 38 are joined (FIG. 6B), grooves 42 and teeth 44 on each bracket may cooperate to form a set of holes 40 sized to fit around discrete electrical conductors 22. Holes 40 may be sized so that organizer 34a can slide along the length of discrete electrical connectors 22. When a connector is to be attached to the discrete electrical conductors 22, a clamping force, F, may be applied to organizer 34a, creating smaller holes 46, so that organizer 34a will hold the discrete electrical conductors 22 in place during the attachment process. Organizer 34a, as shown, may hold the set of discrete electrical conductors 22 in two parallel planes rather than in a single plane.

FIGS. 7A and 7B show another example organizer 34b. Organizer 34b may include an upper bracket 36, a lower bracket 38, hinge 47, and clip 48. Organizer 34b may be formed integrally so that upper bracket 36, lower bracket 38, hinge 47, and clip 48 are all features of a single unit. For example, organizer 34b may be molded plastic. In the embodiment shown, upper bracket 36 and lower bracket 38 may include a set of grooves 42 arrayed to cooperate to make a set of holes 40 sized to slide around discrete electrical conductors 22. As with organizer 34a, clamping force, F, applied to organizer 34b may operate to hold discrete electrical conductors 22 in place while one or more connectors are attached. Hinge 47 and clip 48 may be operable by a user during the fabrication of discrete wire ribbon cables. Hinge 47 may provide a pivot point allowing lower bracket 38 and upper bracket 36 to rotate in relation to one another. Clip 48 may include tooth 50 configured to releasably attach upper bracket 36 to lower bracket 38 for use to organize discrete electrical conductors 22 for the attachment of one or more connectors.

Discrete wire ribbon cables may provide several benefits in comparison to typical ribbon cables. For example, discrete wire ribbon cables may allow reduced minimum bend radius, simplify shielding of the discrete conductors, allow rotation and/or reorientation to correct misalignment issues without significant reworking, increase flexibility for PCB layout and design, facilitate splitting cables, and/or provide simple interfaces between COTS and GOTS connectors. Although the figures and embodiments disclosed herein have been described, it should be understood that various changes, substitutions and alternations can be made herein without departing from the spirit and scope of the disclosure as illustrated by the following claims.

What is claimed:

1. An organizer for use in forming a multi-wire cable for use in electronic networks, the organizer comprising:
   an upper bracket; and
   a lower bracket configured to mate with the upper bracket;
   wherein the upper bracket and the lower bracket combine to define a plurality of holes;
   the plurality of holes sized to at least partially enclose a set of discrete conductors, each of the set of discrete conductors individually insulated,
   wherein the organizer is slidable along a length of the discrete conductors when the upper and lower brackets are mated.

2. An organizer according to claim 1, further comprising the plurality of holes arrayed at a 0.025 inch pitch.

3. An organizer according to claim 1, further comprising the plurality of holes arrayed at a 0.050 inch pitch.

4. An organizer according to claim 1, further comprising the plurality of holes arrayed at a 1.0 mm pitch.

5. An organizer according to claim 1, further comprising the plurality of holes arrayed in two parallel planes.

6. An organizer according to claim 1, further comprising the plurality of holes arrayed in two parallel planes, the two parallel planes spaced from one another at a predetermined distance to match a given connector.

7. An organizer according to claim 1, further comprising the plurality of holes arrayed in a single plane.

8. An organizer according to claim 1, further comprising the plurality of holes arrayed in two parallel planes, wherein a first set of holes in the first of the two parallel planes is offset from a second set of holes in the second of the two parallel planes.

9. An organizer according to claim 1, further comprising the upper bracket and the lower bracket connected by a pivot.

10. An organizer according to claim 1, further comprising:
    a clip operable to fix the upper bracket and the lower bracket in position relative to one another; and
    the upper bracket and the lower bracket connected by a pivot disposed separately from the clip.

11. An organizer according to claim 1, wherein the upper bracket and the lower bracket are formed integrally.

12. An organizer according to claim 1, further comprising a clip operable to hold the upper bracket and the lower bracket in place once they have been mated.

13. An organizer according to claim 1, further comprising the organizer usable for forming multiple discrete wire ribbon cables.

14. An organizer according to claim 1, wherein the upper bracket and the lower bracket, when mated, are positionable upon application of a force to reduce the size of the holes to hold the discrete conductors in place.

15. A multi-wire cable for use in electronic networks, the multi-wire cable comprising:
    a set of discrete electrical conductors of similar length arrayed in a generally flat plane, each electrical conductor having a respective first end and a second end;
    each one of the set of electrical conductors wrapped in an individual insulator;
    at least one organizer disposed between the first end and the second end of the set of discrete electrical conductors, the organizer comprising:
        an upper bracket; and
        a lower bracket configured to mate with the upper bracket;
        wherein the upper bracket and the lower bracket combine to define a plurality of holes;
        the plurality of holes arrayed to at least partially enclose each of the set of discrete electrical conductors; and
    a first connector disposed at the first end of each conductor of the set of electrical conductors;
    wherein the organizer operates to align the set of discrete electrical conductors so that a second connector may be disposed at the second end of each conductor of the set of electrical conductors.

16. A multi-wire cable according to claim 15, further comprising the set of electrical conductors arrayed at a 0.025 inch pitch.

17. A multi-wire cable according to claim 15, further comprising the set of electrical conductors arrayed at a 0.050 inch pitch.

18. A multi-wire cable according to claim 15, further comprising the set of electrical conductors arrayed at a 1.0 mm pitch.

19. A multi-wire cable according to claim 15, further comprising two or more of the set of discrete electrical conductors bundled together.

20. A multi-wire cable according to claim 15, further comprising two or more of the set of discrete electrical conductors bundled together and wrapped with an electromagnetic shielding.

21. A multi-wire cable according to claim 15, further comprising a second set of discrete electrical conductors arrayed in a flat plane, wherein the flat plane of the second set is offset from the flat plane of the first set of discrete electrical conductors and disposed adjacent the first set to create a single multi-wire cable.

22. A multi-wire cable according to claim 15, further comprising the plurality of holes arrayed in two parallel planes, wherein a first set of holes in the first of the two parallel planes is offset from a second set of holes in the second of the two parallel planes.

* * * * *